(12) United States Patent
Déverin et al.

(10) Patent No.: US 6,643,070 B2
(45) Date of Patent: Nov. 4, 2003

(54) VIEWING TUBE FOR AN OPTICAL DEVICE

(75) Inventors: Jacques Alain Déverin, Widnau (CH); Benno Moser, Berneck (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 10/080,106

(22) Filed: Feb. 21, 2002

(65) Prior Publication Data

US 2002/0159157 A1 Oct. 31, 2002

(30) Foreign Application Priority Data

Feb. 23, 2001 (DE) ............................ 101 08 989

(51) Int. Cl.⁷ .................... G02B 27/14; G02B 21/22; G02B 21/00; G02B 21/18; G02B 27/10
(52) U.S. Cl. .................. 359/629; 359/376; 359/368; 359/372; 359/618
(58) Field of Search ........................ 359/629, 372, 359/375, 376, 384, 392, 210, 211, 464, 462, 465, 466, 471, 480, 618

(56) References Cited

U.S. PATENT DOCUMENTS

| | | | | |
|---|---|---|---|---|
| 4,138,191 A | * | 2/1979 | Peyman et al. | 359/363 |
| 4,516,840 A | * | 5/1985 | Nakahashi et al. | 359/376 |
| 4,685,776 A | * | 8/1987 | Inoue et al. | 359/363 |
| 5,742,434 A | * | 4/1998 | Carmeli | 359/629 |
| 6,088,155 A | * | 7/2000 | Tandler et al. | 359/381 |
| 6,276,804 B1 | * | 8/2001 | Tandler et al. | 359/614 |

* cited by examiner

Primary Examiner—Hung Xuan Dang
Assistant Examiner—Joseph Martinez
(74) Attorney, Agent, or Firm—Hodgson Russ LLP

(57) ABSTRACT

A viewing tube for an optical device and in particular for a microscope is described, in which there are provided in the beam path of the viewing tube beam splitters that deflect a portion of the light out to a simultaneous observation tube and/or to an imaging or recording unit, or reflect light from a display and/or processing unit into the beam path. In each beam path of the viewing tube there is provided only one beam splitter, which is rotatable about the optical axis of the respective beam path and always remains in the working position in the beam path. The respective beam splitter, depending upon its rotational position, deflects the reflected-out portion of the light into the corresponding beam path of the simultaneous observation tube or of the imaging or recording unit, or couples light into the beam path of the viewing tube.

3 Claims, 1 Drawing Sheet

VIEWING TUBE FOR AN OPTICAL DEVICE

CROSS REFERENCE TO RELATED APPLICATIONS

This invention claims priority of the German patent application 101 08 989.9 filed Feb. 23, 2001 which is incorporated by reference herein.

FIELD OF THE INVENTION

The invention refers to a viewing tube for an optical device and in particular for a microscope.

BACKGROUND OF THE INVENTION

Viewing tubes of the species are generally known. The reader is referred, purely by way of example, to DE 34 32 635 C2, DE 196 22 357 A1, or EP 1 058 141 A2, to which reference is moreover expressly made for an explanation of all terms not described in further detail here.

In the microscopes of the species known from these documents, beam splitters which deflect a portion of the light to a simultaneous observation tube and/or to an imaging or recording unit, for example a photographic camera or a video unit, are provided in the beam path of the viewing tube. Alternatively or additionally, the beam splitters can also reflect into the beam path light from a display and/or processing unit, for example a treatment laser and/or target beam laser. The reader is referred to U.S. Pat. No. 4,138,191 for additional information.

In the known microscopes of the species, multiple beam splitters, each of which is permanently associated with a specific device or a specific task, are therefore provided in succession in the beam path of the viewing tube. Since often not all of the functions that can be performed with these "cascaded" beam splitters are needed, the beam splitters provided in succession in the beam path result in a light attenuation that is unnecessary in many applications.

It has therefore been proposed, in a patent application not previously published, to join the beam splitters immovably to the respective device so that in the event of non-use they can be removed from the beam path. But since it is often not necessary to implement all functions simultaneously, the option of being able to mount a variety of devices, each with an associated beam splitter, on the microscope and successively in the beam path increases the overall height.

SUMMARY OF THE INVENTION

It is the object of the invention to further develop a viewing tube for an optical device, and in particular for a microscope, in such a way that with no unnecessary attenuation of the light passing through the viewing tube and with no unnecessary increase in the overall height, the various functions, such as reflecting the light out to different units and/or reflecting the light into the respective beam path, can be implemented sequentially in time.

A manner according to the present invention of achieving this object is described herein. Developments of the invention are the subject matter of the dependent claims.

Although a wide variety of functions can be implemented, according to the present invention only a single beam splitter is provided in each beam path of the viewing tube. This guarantees that the overall height of the device is as small as possible. According to the present invention, the beam splitter is rotatable about the optical axis of the respective beam path. The beam splitter thus deflects a portion of the light of the respective beam path in different directions depending on its rotational position. If the different units desired—such as simultaneous observation tubes, imaging or recording units, display units for presenting images and/or data, and/or units for reflecting light into the beam path of the viewing tube—are then arranged in those different directions, then the various functions desired can be implemented on the basis of the particular rotational position. Not just two, but even three or more functions, and a corresponding number of rotational positions, can be allocated to each beam splitter, while the beam splitter (in contrast to the existing art, in which the beam splitter is replaced and/or displaced) always remains in a functional position in the beam path.

Rotation of the beam splitters introduced into the individual beam paths can be performed in coupled and/or uncoupled fashion. In coupled rotation, actuation of an adjusting element causes both beam splitters to rotate, whereas in uncoupled rotation the beam splitters introduced into the left and right beam paths can be rotated independently of one another.

In a preferred development of the invention the viewing tube has, in a manner known per se, a binocular beam path. In this case it is possible, for example, in one rotational position of the beam splitters to reflect light out of the two beam path segments into a binocular simultaneous observation tube, and in another rotational position to reflect light out of one beam path segment onto an imaging or recording unit and to reflect light into the other beam path segment. The light can be, for example, the light of a display unit or the light of an illumination light source or a processing unit.

In a further preferred embodiment of the invention, each beam splitter has two rotational positions; the two rotational positions can easily be defined by stops, so that the respective beam splitter is exactly adjusted in terms of its rotational position.

A wide variety of beam splitter elements, such as wavelength-selective splitters, polarization splitters, or neutral splitters, such as semitransparent mirrors, and in particular beam splitter cubes, can of course be used as beam splitters.

Use of the viewing tube according to the present invention in a stereomicroscope is especially preferred.

It is additionally possible to combine the basic idea according to the present invention—of implementing a very wide range of functions by means of only a single beam splitter, introduced into each beam path of the viewing tube, that always remains in its working position—with the basic ideas that are described in an application submitted on the same date; that application describes the fact that a display module and an imaging module are arranged in stationary fashion on a basic body of an optical device, such as a microscope. Optical connection of the modules to one or both beam paths is accomplished via optical switches that open up or close off the optical paths.

BRIEF DESCRIPTION OF THE DRAWINGS

The invention will be described in more detail below on the basis of an exemplary embodiment with reference to the drawings, in which.

DETAILED DESCRIPTION OF THE INVENTION

Figure 1:
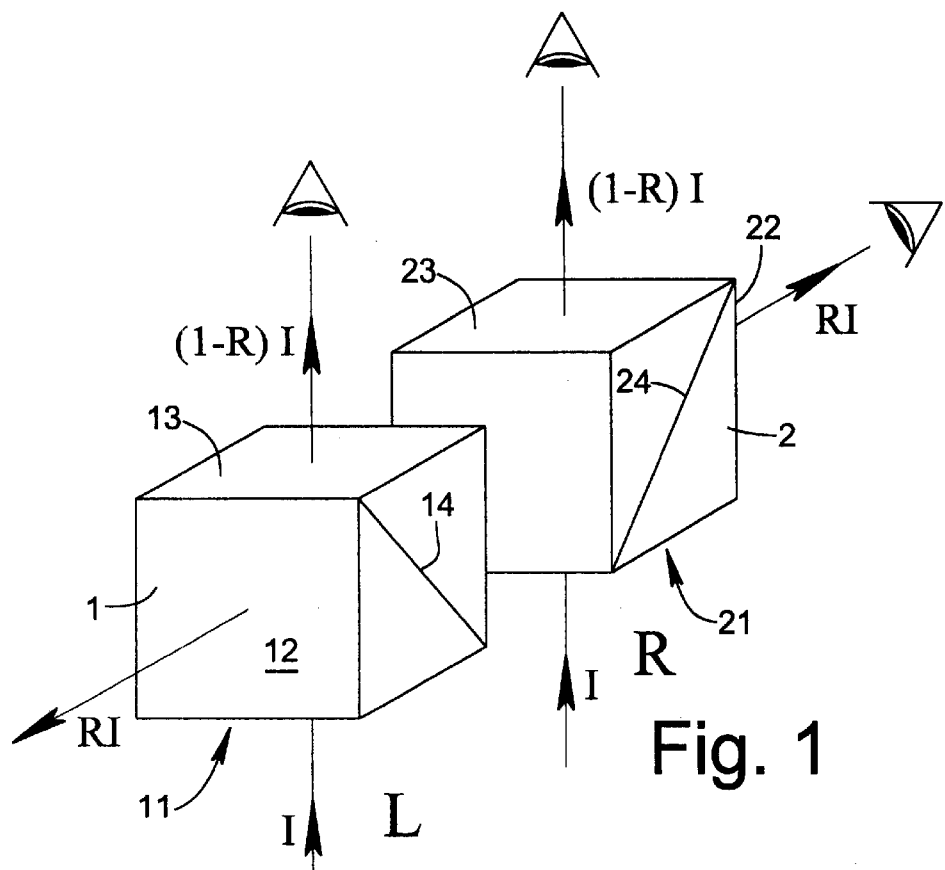
FIG. 1 shows the exemplary embodiment in a first position of the beam splitter cubes.

FIG. 1 shows an exemplary embodiment of the invention in which, with no limitation as to the general applicability of the invention, a respective beam splitter cube 1 and 2 is arranged in the left (L) and right (R) beam path segment of a stereomicroscope (not depicted in further detail). Beam splitter cubes 1 and 2 are preferably but not necessarily located in the portion of the beam path in which the latter is parallel. Light I coming from a microscope objective (not depicted) passes through surfaces 11 and 21 into beam splitter cubes 1 and 2, respectively. At the respective splitter surfaces 14 and 24, a portion R*I of the light is deflected 90 degrees and emerges from surfaces 12 and 22. The continuing light beam, having an intensity (1−R)*I, emerges from surfaces 13 and 23. The possibilities for observation by the observer or observers are depicted schematically.

In the rotational position depicted in FIG. 1, beam splitter cubes 1 and 2 are arranged in such a way that surfaces 12 and 22 are oriented oppositely to one another. In this position, for example, light can be deflected by beam splitter cube 1 onto an imaging unit. Beam splitter cube 2 can, for example, be used to reflect light onto a specimen slide. Of course it can also be used in a monocular simultaneous observation tube.

Figure 2:
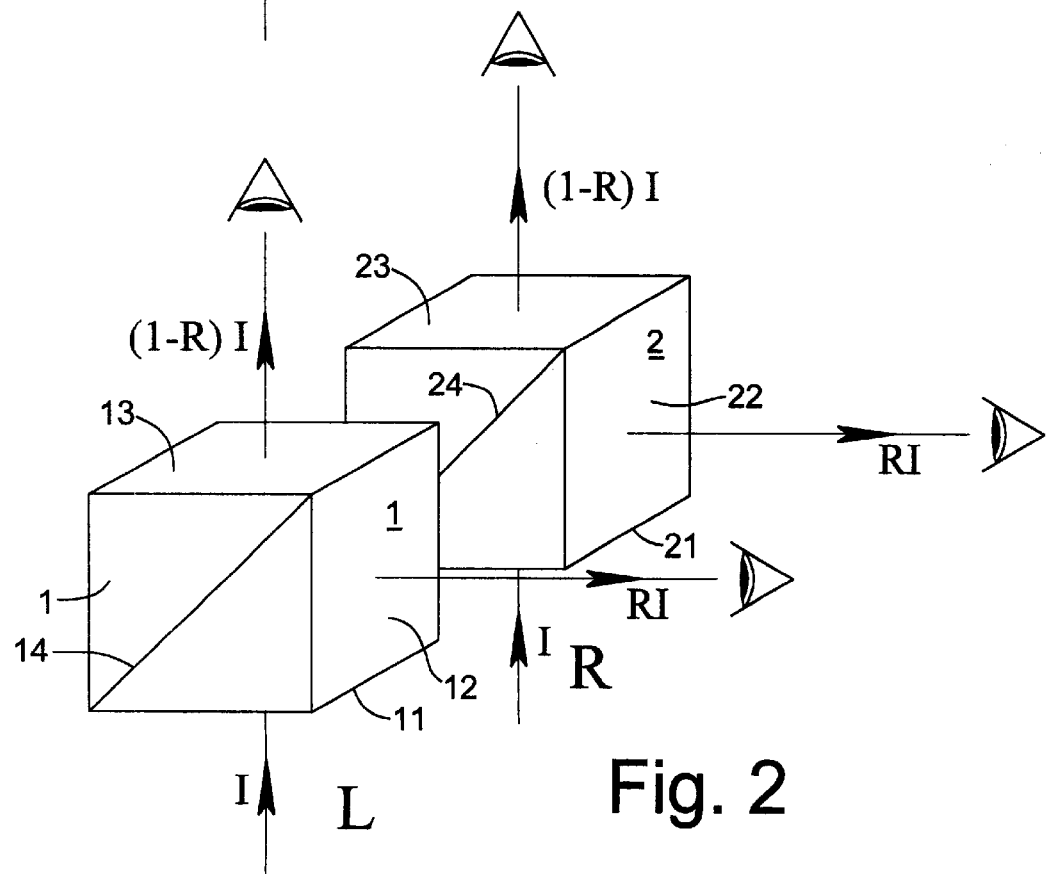
FIG. 2 shows the exemplary embodiment in a second position of the beam splitter cubes.

In the rotational position depicted in FIG. 2, beam splitter cubes 1 and 2 are arranged in such a way that surfaces 12 and 22, from which the reflected-out light emerges, are arranged on the same side. In this rotational position, the light can thus be reflected out into a simultaneous observation tube that is also binocular or stereoscopic.

The invention has been described above with reference to an exemplary embodiment, with no limitation as to the general idea of the invention.

| PARTS LIST | |
|---|---|
| 1, 2 | Beam splitter cubes |
| 11, 21 | Entrance surface of beam splitter cubes |
| 12, 22 | Exit surface of deflected light beam |
| 13, 23 | Exit surface of continuing light beam |
| 14, 24 | Splitter surface |
| I | Incident light |
| R*I | Reflected-out light |
| (1-R) *I | Continuing light |
| L | Left beam path |
| R | Right beam path |

What is claimed is:

1. A viewing tube for a stereomicroscope having first and second beam paths, said viewing tube comprising:

a first beam splitter fixed at an axial location in said first beam path, said first beam splitter being rotatable about said first beam path; and a second beam splitter fixed at an axial location in said second beam path, said second beam splitter being rotatable about said second beam path;

said first and second beam splitters having a first mutual setting wherein said first and second beam splitters are positioned to reflect light from said first and second beam paths in opposite directions, and a second mutual setting wherein said first and second beam splitters are positioned to reflect light from said first and second beam paths in a common direction;

whereby, in said first mutual setting, said first and second beam splitters can each be used to reflect light to or receive light from an independent non-stereo optical device used simultaneously with said stereomicroscope, and whereby, in said second mutual setting, said first and second beam splitters can be used to reflect light to a stereo observation tube used simultaneously with said stereomicroscope.

2. The viewing tube as defined in claim 1, wherein each of said first and second beam splitters has two predetermined rotational positions respectively corresponding to said first and second mutual settings.

3. The viewing tube as defined in claim 1, wherein each of said first and second beam splitters is a beam splitter cube.

* * * * *